Figure 6:
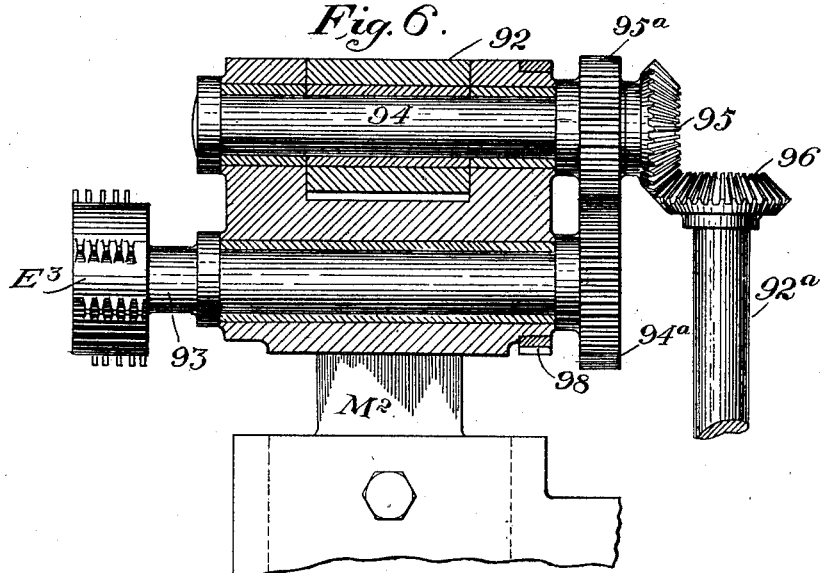

No. 717,167. Patented Dec. 30, 1902.
W. L. CHENEY.
MACHINE FOR CUTTING RACK TEETH.
(Application filed Apr. 10, 1902.)
(No Model.) 3 Sheets—Sheet 1.
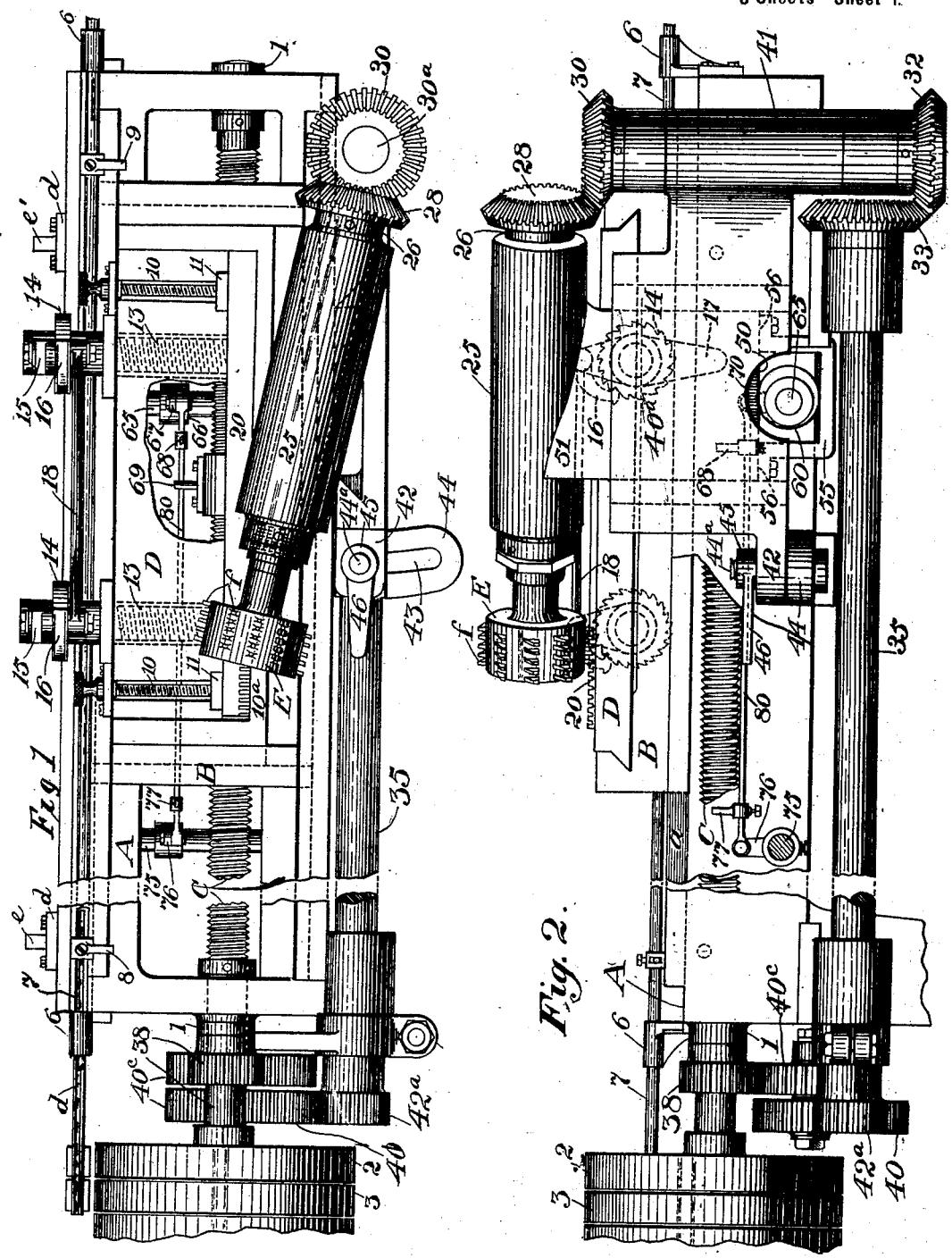
Witnesses
H. Everett Wade
Robert Head
Inventor,
Walter L. Cheney
By his Attorney, F. H. Richards.

No. 717,167. Patented Dec. 30, 1902.
W. L. CHENEY.
MACHINE FOR CUTTING RACK TEETH.
(Application filed Apr. 10, 1902.)
(No Model.) 3 Sheets—Sheet 2.
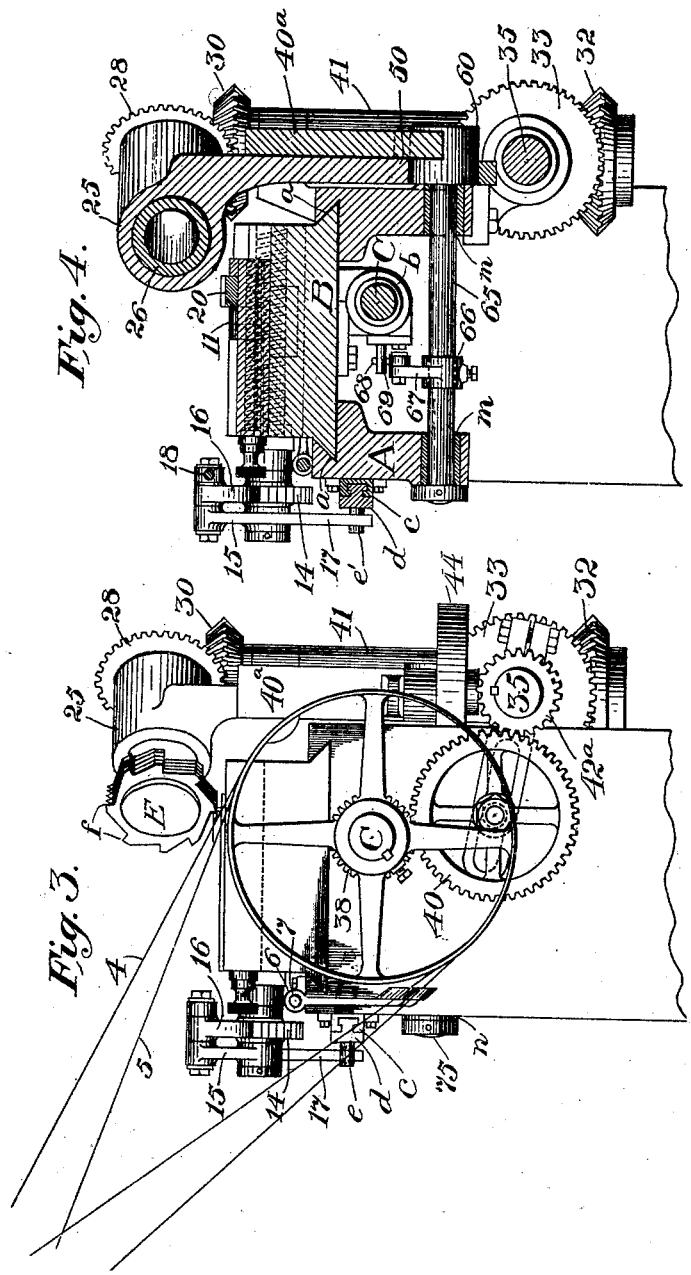
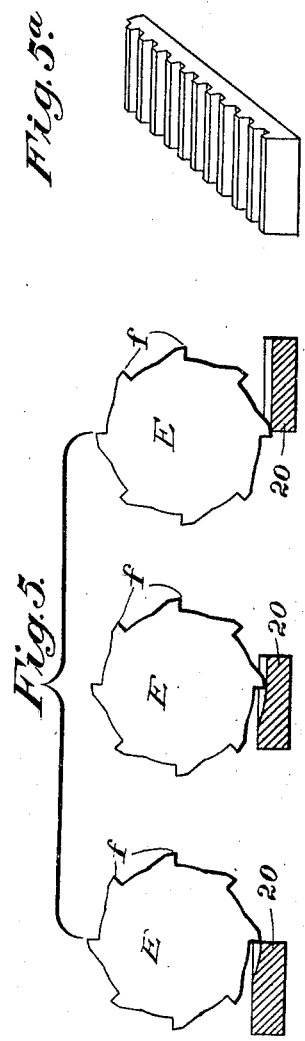
Witnesses.
Inventor.
Walter L. Cheney.
By his Attorney No. 717,167. Patented Dec. 30, 1902.
W. L. CHENEY.
MACHINE FOR CUTTING RACK TEETH.
(Application filed Apr. 10, 1902.)

(No Model.) 3 Sheets—Sheet 3.

Witnesses
W. Everett Wade
Robert Head

Inventor
Walter L. Cheney
By his Attorney, F. H. Richards.

UNITED STATES PATENT OFFICE.

WALTER L. CHENEY, OF MERIDEN, CONNECTICUT, ASSIGNOR OF ONE-HALF TO BENJAMIN HOWARD WARREN, OF PITTSBURG, PENNSYLVANIA.

MACHINE FOR CUTTING RACK-TEETH.

SPECIFICATION forming part of Letters Patent No. 717,167, dated December 30, 1902.

Application filed April 10, 1902. Serial No. 102,160. (No model.)

*To all whom it may concern:*

Be it known that I, WALTER L. CHENEY, a citizen of the United States, residing in Meriden, in the county of New Haven and State of Connecticut, have invented certain new and useful Improvements in Machines for Cutting Rack-Teeth, of which the following is a specification.

This invention relates to machines for cutting or forming rack-bar teeth; and it consists, substantially, in the improvements hereinafter more particularly described.

The invention has for its object to overcome many of the difficulties and objections hitherto encountered in this class of machines and to provide means for effectually cutting or forming the teeth of rack-bars simultaneously with the feed of the bar longitudinally of the machine.

A further object is to provide simplified and effective means for varying the angular position of the revolving cutter, and also to provide means for changing or shifting the transverse position of the bar at the end of the longitudinal feed movements thereof, whereby different portions of the bar may be successively presented to the action of the revolving cutters in the cutting or formation of the rack-teeth.

A further object of the invention is to provide means for raising or elevating the revolving cutters from the work at the end of each feed movement of the carriage and to again lower the said cutters upon the work immediately after the carriage has returned to its original or starting position.

A still further object of the invention is to provide means whereby the cutting of rack-teeth may be effected on the movement or feed of the supporting-carriage in either direction, and also to simplify the construction and organization of the operative elements of the machine, to the end of superior practical results with a minimum of labor and a lessening of expense as compared with some embodiments hitherto devised with similar purposes in view.

The above and additional objects I attain by means substantially such as I have illustrated in the accompanying drawings, in which—

Figure 7:
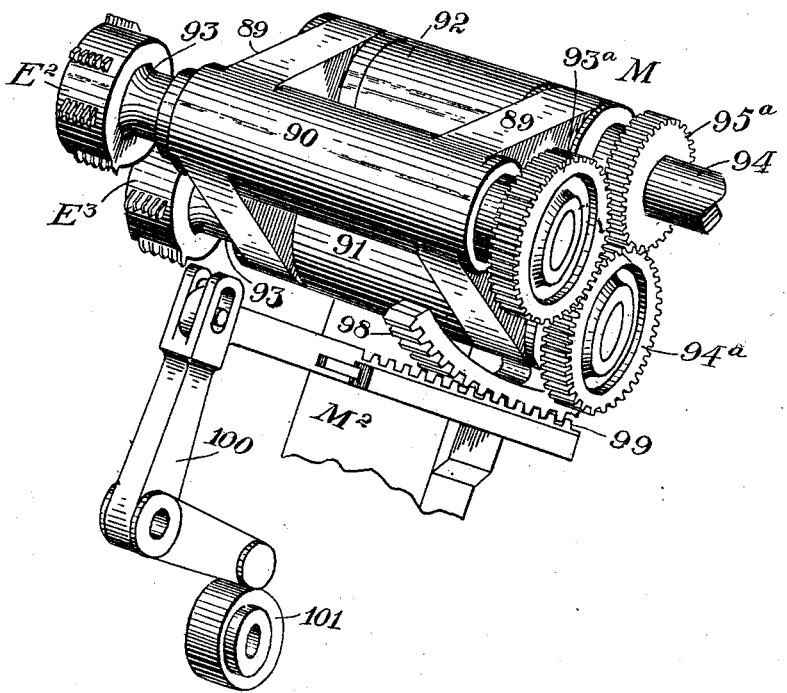

Figure 1 is a top plan view of a rack-cutting machine embodying my improvements, and Fig. 2 is a side view thereof. Fig. 3 is an end view of the machine looking from the left in Figs. 1 and 2; and Fig. 4 is a transverse sectional view of Fig. 2, taken in a vertical plane through the vertically-movable slide which supports the revolving cutter or hob. Fig. 5 indicates diagrammatic views or representations of the different transverse positions to which the rack-bar is successively shifted to be operated upon by the cutting devices in the formation of the rack-teeth, and Fig. 5$^a$ is a view in perspective of a section of completed rack-bar. Fig. 6 is a longitudinal sectional view of Fig. 7 with parts in elevation. Fig. 7 is a perspective view of a modification, showing the means employed for effecting operations upon the rack-bar on the movement of the supporting-carriage therefor in each direction.

Before proceeding with a more detailed description it may be stated that in practice I employ any preferred type of machine, upon the bed of which is mounted a suitable carriage which is operated to be moved in opposite directions longitudinally of the machine by means of a suitable feed-screw mounted or held in suitable bearings and provided at one end with operating-pulleys, which are driven by means of ordinary straight and crossed belts or in any other suitable way. The said carriage is provided with a slide having a movement transversely thereto and to the machine, and said slide is in turn provided with suitable means for securing in place the bar in which the rack-teeth are to be cut or formed. Suitable means are provided whereby on each complete forward and return movement of the carriage longitudinally of the machine the transversely-movable slide is operated upon to move or shift the bar to be operated, so as to present new or fresh portions thereof to the action of the cutters on the revolving head. The cutters are spirally disposed around the cutter-head, and the latter and its shaft are located at an angle with respect to the sides of the machine, so that said cutters will be presented to the upper surface of the bar in a manner to successively cut out portions of the bar in straight lines transversely thereof. As soon as the carriage reaches the limit of its feeding movement longitudinally of the machine a suitable shipping-bar is actuated to ship the driving-belt so as to reverse the direction of rotation of the feed-screw for said carriage, and simultaneously with this action suitable means are operated to lift or elevate the cutting mechanism to a position above the work, so as to permit return of the carriage and work to the starting-point without obstruction. On reaching such starting-point the direction of rotation of the feed-screw is again reversed, also by the action of the shipping-rod, and the cutting mechanism is lowered to operative position, as before, whereupon the cutting operation is repeated, and so on until the cutting of the teeth is completed across the full width of the bar. I have also provided simple and effective devices or means for changing the angular position of the revolving cutter mechanism by which to vary or alter the pitch of the rack-teeth to be cut, and, as is common in some machines of this class or type, I provide suitable change-gear by which to alter the speed of rotation of the feed-screw for the carriage and bar.

In some instances I am enabled to effect a cutting of teeth upon the bar in the movement of the carriage and bar in each direction longitudinally of the machine, it being only necessary to duplicate the revolving cutter mechanism in part and to slightly modify the organization and operation thereof, without, however, altering the character of the invention. It will be understood that I am not limited to the precise details of construction and organization herein shown and described, since various immaterial changes therein may be made and still come within the scope of the invention.

Specific reference being had to the accompanying drawings by the designating characters thereon, A represents the bed of the machine, upon which is mounted in guides $a$ $a$ a suitable carriage B, which is substantially a rectangular frame provided at a suitable point on the under side thereof with a nut or threaded sleeve $b$, through which passes the feed-screw C, supported longitudinally of the machine in suitable bearings 1 1 therefor, and on one end of which screw are carried or mounted the pulleys 2 3, which are driven alternately in opposite directions by the straight and twisted belts 4 and 5, Fig. 3, respectively, which in turn receive their motion from any suitable source. Supported in suitable bearings 6 6 therefor upon the machine or its bed is a shipping-rod 7, having arms 8 9 at suitable points thereon which are engaged alternately by the ends of the carriage in the reciprocating movements of the latter longitudinally of the machine, and in this way the motion of the feed-screw is received alternately from the said straight and cross belts, and thus reversed to reverse the direction of movement of the said carriage. Fitted upon the carriage B, so as to have movement transversely thereof, is a slide D, provided with any suitable form of clamp, such as the screws 10 10, which, together with suitable setting-blocks 11 11 and the longitudinal portion $10^a$ of the slide, serve to hold the bar 20 to be operated upon firmly in position and parallel with the direction of feed of the carriage.

Secured to one side (at the left, Figs. 3 and 4) of the machine is a grooved guide $c$, in which are fitted, at points corresponding to the limit of the longitudinal movements of the carriage B, suitable blocks $d$ $d$, having projections $e$ $e'$ therefrom, and supported transversely of said carriage are parallel screw rods or shafts 13, which are operated intermittently, as about to be described, by which to effect the transverse feed of the slide and bar to present new or fresh portions of the latter to be acted upon by the cutting devices $f$ on the revolving cutter-head E, hereinafter referred to, each time the return movement of the carriage takes place. The outer ends of these screw rods or shafts 13 extend beyond the side of the machine, as shown, and each one is provided with a ratchet-wheel 14 rigid thereon, each also being provided with a loose upstanding arm 15, having pivoted thereto a pawl 16, (see Fig. 4,) the free ends of which pawls take into or engage under the teeth of said ratchet-wheels. That one of the screw rods or shafts farthest from the driving mechanism for the feed-screw B is also provided with a downwardly-extending arm 17, rigid with or forming a part of the said upstanding arm 15, and it will be noted (see Figs. 1 and 2) that the two said arms 15 are movably connected at their upper ends by means of a rod 18, located intermediate the projecting ends of the said screw rods or shafts 13, as shown. With the organization herein shown the feed of the carriage for effective operations of the cutting devices upon the bar 20 takes place from right to left of the machine, Figs. 1 and 2, and it is to be also noted that the position or location of the projections $e$ $e'$ on the frame is such that the said downwardly-extending arm 17 will be engaged by one or the other of them, accordingly as the carriage be moved to its limit in one direction or the other. In the operation of the machine when the carriage reaches the limit of its movement (feed) to the left the said arm 17 is engaged by the projection $e$, and then the two arms 15 are moved to the left by means of the rod connection between them, and the pawls carried thereby are swung down or lowered in such manner as to take under a lower one of the succeeding teeth of said ratchet-wheels 14, according to any predetermined setting or adjustment of parts, and then when the carriage reaches the limit of its return movement to the right, which takes place immediately, the said arm 17 is engaged by the projection $e'$ at that end of the machine, and thus are the arms 15 restored to vertical position. On the return movement of the said arms the ratchet-wheels 14 are turned a corresponding distance by engagement of the pawls 16 therewith, and in this way the screw rods or shafts 13 are turned also a corresponding distance, with the result that the slide D is moved inwardly, with the bar supported or held thereon. The construction and organization of elements referred to affords an effective transverse feed for the bar to be operated upon; but it will of course be understood that I am not limited thereto in the precise details thereof.

The mechanism for cutting the rack-teeth comprises a sleeve or bearing 25, suitably supported at the proper distance above the bed of the machine and in which is rotatably supported a shaft 26, (preferably hollow, as shown in Fig. 4,) which is provided at its inner end with the head E, hereinbefore mentioned, having thereon the said cutters $f$ for operating upon the bar 20 to form the rack-teeth thereon. The said bearing and shaft are arranged or disposed at an angle to the direction of feed of the carriage B, as shown, and consequently the cutter-head is at an angle to the bar 20; but inasmuch as the cutters $f$ are spirally arranged thereon the cut of the teeth will be effected in straight lines transversely of said bar, as is apparent. The outer end of said shaft 26 is provided with a bevel gear-wheel 28, which engages with a similar wheel 30, carried on the upper end of a vertical shaft $30^a$, suitably supported at the side of the machine and provided at its lower end with another bevel gear-wheel 32, with which meshes a corresponding gear-wheel 33 on the adjacent end of a longitudinal operating-shaft 35, receiving its motion from the feed-screw C, through the intermediacy of the gearing indicated at 38, 40, $40^c$, and $42^a$. I may state at this point that any well-known form of change-gear may be employed for increasing or reducing the speed of the feed-screw; but as this is a common expedient I do not deem it necessary to specifically refer to such gearing. Likewise of course the proper changes of the gearing for shaft 35 are also made corresponding to any of the alterations just mentioned with reference to said feed-screw and cutter mechanism.

My invention comprises special means for adjusting and securing the cutter devices or mechanism at different angles to the feed-screw and the bar operated upon, and, as shown in Figs. 1, 2, and 3, said means consist, substantially, of a swinging support $40^a$, having a hinge portion 41, preferably fitting and turning upon the vertical shaft $30^a$ referred to, although the same may be mounted to swing upon any other axis suitably arranged therefor. Said support may be provided with any suitable means for securing the same in the different positions to which it may be swung, said means in the present instance consisting of a clamp comprising a projection 42 on the inner lower corner of the support, said projection having an opening (not shown) therein, which registers with a curved slot 43, formed in a ledge or shelf 44, projecting from the side of the machine below the bed-surface thereof, said slot being concentric with the axis upon which the support swings or turns. Passing through the said curved slot 43 and the opening in the projection 42 from beneath is a threaded bolt $44^a$, having its lower end headed, as shown, and provided on its upper end with a clamping-nut 45, having an operating-lever 46, the turning of which in one direction loosens the nut to permit the support to be swung in or out, while the turning of the same in the other direction tightens said nut and secures said support, all of which is apparent. The inward movement of the swinging support $40^a$ is limited by the adjacent side of the supporting-frame, and for some kinds of work said swinging support occupies a position in parallelism with said frame.

As shown in Figs. 1 to 4, inclusive, the construction and organization of elements constituting my improvements are such that the cutting of the rack-teeth upon the bar 20 is effected only on the feed of the carriage in one direction—that is, from right to left in Figs. 1 and 2—it being understood from previous explanations herein that immediately the carriage reaches the limit of such feed movement the direction of rotation of the feed-screw is reversed to return the carriage to the starting position. To enable such return movements of the carriage to take place regularly and without obstruction, I provide certain devices or means for raising the cutter devices from the work immediately the carriage reaches the end or limit of its feed movement, said means operating to maintain said cutter devices in elevated position during the time the carriage is returning, whereupon they are again operated to lower the cutter devices, as before, to resume the work of cutting the teeth, the bar 20 meanwhile having been fed or moved transversely of the carriage, as already explained. Said raising and lowering devices are capable of embodiment in different ways and in the present instance consist, preferably, of a slide 50, having vertical movement in or upon the swinging support $40^a$ and constructed at its upper end with a curved wing or wings 51, upon the edge of which the sleeve or bearing 25 for the shaft 26 is rigidly supported at a suitable angle. Said support and sleeve in some instances are preferably made integral with each other, substantially as shown in Fig. 4. The lower edge or end of said vertically-movable slide 50 is provided with what may be termed an "eccentric strap or guide" 55, secured thereto at 56 56 by bolts or in any other suitable way and in which strap works an eccentric 60, which engages said lower edge of the slide and raises or lowers the slide, (and consequently the cutter devices,) according to the direction in which the said eccentric is rotated. The eccentric is carried at one end of a transverse shaft 65, mounted to work in suitable bearings $m$ $m$ therefor at the sides of the machine beneath the bed thereof, said shaft having clamped thereon at a suitable point a collar 66, having a normally upstanding arm 67, provided with a pin 68, which is engaged by a projection 69 on the under side of the carriage, as and for the purpose hereinafter explained. To accommodate a part of the eccentric and permit of the proper working thereof, the lower edge of the support $40^a$ is notched at 70, the said eccentric being of considerable thickness, as shown, by which to still effectually operate the slide 50 irrespective of slightly-varying positions to which said support may be adjusted outwardly or inwardly. Also mounted to work in bearings $n$ $n$ therefor at the sides of the machine and nearer the other end thereof is another transverse shaft 75, provided in like manner as the shaft 65 with an upstanding arm 76, similar to arm 67 and in line therewith, the said arm 76 also having a pin 77, which is engaged (as presently described) by the projection 69 of the longitudinally-movable carriage. The two arms 67 and 76 are movably connected by a rod 80, so that when either of them is operated from the carriage the other will also be actuated in unison therewith. The shaft 75 and its arm 76 are so located that the pin on the latter will be engaged by the projection 69 on the carriage just as said carriage reaches the limit of its movement (feed) in the left-hand direction, Figs. 1 and 2, and thus will the shaft 75 (or only the arm thereon) be rocked, as will also the shaft 65, due to the rod connection 80 between arms 67 and 76, said latter shaft turning the eccentric 60 therewith and elevating the slide and cutter devices in an obvious manner. In the meantime reversal of rotation of the feed-screw has taken place and the carriage started to return, and upon reaching the limit of such return movement the pin 68 on the arm 67 of shaft 65 is engaged by the projection 69 of the carriage, and thus are the two shafts 65 and 75 rocked in the reverse direction, the latter shaft carrying the eccentric around in such manner that the slide 50 and cutter devices are again lowered in position for the latter to resume operations upon the rack-bar, as before. In Fig. 5 the successive transverse adjustments of the bar are shown, by which different portions thereof are caused to be presented to the action of the spirally-arranged cutters on the cutter-head or hob E.

In some instances it may be desirable to operate upon the bar 20 to cut teeth therein on movement of the carriage and bar in each direction and for which purpose suitable means are herein shown at Figs. 6 and 7 as illustrative of an embodiment of elements for that purpose. Substantially the same form of movable carriage and feed therefor may be retained in this connection, it only being necessary, probably, to duplicate the transverse feed devices for the bar or in some manner organize such devices so that the bar will be shifted at the limit of movement of the carriage in each direction. In said Figs. 6 and 7 a supporting-frame M is shown for duplicate cutter mechanisms, which frame is substantially triangular at the end portions 89 89 thereof, and extending between such end portions at the angles or corners thereof are the sleeves or tubular bearings 90, 91, and 92 for the two shafts 93 93 and the operating-shaft 94, driven by beveled gears 95 and 96 from a suitably-supported vertical shaft $92^a$, said mentioned shafts being provided at corresponding ends with the intermeshing gears $93^a$, $94^a$, and $95^a$, as shown. At their opposite ends the said shafts 93 93 are provided with hobs or cutter-heads $E^2$ $E^3$, each having spirally-disposed cutters thereon, and it is to be noted that formed with the said frame M is a pendent portion $M^2$, which corresponds with the slide 50, hereinbefore referred to. At that end of said frame adjacent the intermeshing gearing referred to is formed a segmental rack 98, the teeth of which are engaged by the teeth of a straight rack-bar 99, to the end of which is fastened, by means of a slot-and-pin connection, a crank 100, the end of the lower arm of which is engaged by a suitable eccentric 101, operated in like manner as the other eccentric 60, hereinbefore referred to. With this said modified form of my invention the said pendent portion $M^2$ of the frame M is simply mounted in position upon substantially the same form of swinging support $40^a$ hereinbefore mentioned, so that when the longitudinally-movable carriage starts from one of its limits of movement one of the cutter mechanisms will begin to operate upon the bar while fed or moved in one direction, and then when the carriage reaches the other limit of movement thereof the engagement of the crank 100 by the eccentric will operate the rack 99 to partially rotate the frame M, so as to raise the cutter mechanism then at work and lower the other to operate upon the rack-bar in similar manner during the next return motion of the carriage, and so on.

As already stated, I do not wish to be understood as limiting myself to the details of construction or organization of elements constituting either of the embodiments herein shown.

Having described my invention, I claim—

1. In a machine for cutting rack-teeth, a supporting-frame, and a longitudinally-movable carriage and feed therefor, means on the carriage for supporting a bar to be operated upon, a transverse feed for said means, cutter devices, a swinging support for the latter adapted to be swung outwardly from the side of the supporting-frame, the inward movement of said support being limited by said frame, and a vertically-movable slide on the support for raising and lowering said cutter devices.

2. In a machine for cutting rack-teeth, a supporting-frame, and a longitudinally-movable carriage and feed therefor, means on the carriage for supporting a bar to be operated upon, a transverse feed for said means, cutter devices, a swinging support for the latter adapted to be swung outwardly from the side of the supporting-frame, and the inward movement thereof being limited by said frame, means for securing the support at varying angles, and means operating to elevate said cutter devices from the work at the end of the feed movement of the carriage, and to again lower the devices on completion of the return movement of said carriage.

3. In a machine for cutting rack-teeth, a carriage having longitudinal reciprocating movement, a feed therefor, means on the carriage for supporting the bar to be operated upon, a transverse feed for said means, cutter devices, a vertically-movable slide supporting said devices, a swinging support for the slide, means for securing said swinging support at different angular positions, and means for raising said slide at the end of the feed movement of the carriage and again lowering the same on the completion of the return movement of said carriage.

4. In a machine for cutting rack-teeth, a carriage having longitudinal reciprocating movement, a feed therefor, means on the carriage for supporting the bar to be operated upon, a transverse feed for said means, cutter devices, a vertically-movable slide supporting said devices, transverse rock-shafts mounted in the frame, one bearing an eccentric and each supporting an arm having a projection, said arms being movably connected together, and means alternately engaging said projections to operate the eccentric to elevate the slide to lift the cutters from the work at the end of the feed movement of the carriage, and to again lower said cutters to the work on completion of the return movement of the carriage.

WALTER L. CHENEY.

Witnesses:
J. R. BROUGHTON,
EDWARD MORAN.